US010596866B2

(12) United States Patent
Li (10) Patent No.: US 10,596,866 B2
(45) Date of Patent: Mar. 24, 2020

(54) TIRE AIR PRESSURE DETECTION SYSTEM AND VEHICLE BODY SIDE DEVICE

(71) Applicants: AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi (JP)

(72) Inventor: Qiying Li, Yokkaichi (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 16/339,636

(22) PCT Filed: Oct. 2, 2017

(86) PCT No.: PCT/JP2017/035791
§ 371 (c)(1),
(2) Date: Apr. 4, 2019

(87) PCT Pub. No.: WO2018/066498
PCT Pub. Date: Apr. 12, 2018

(65) Prior Publication Data
US 2019/0241029 A1 Aug. 8, 2019

(30) Foreign Application Priority Data

Oct. 5, 2016 (JP) ................. 2016-197313

(51) Int. Cl.
*B60C 23/04* (2006.01)
*G01L 17/00* (2006.01)
*B60C 19/00* (2006.01)

(52) U.S. Cl.
CPC .......... *B60C 23/0416* (2013.01); *B60C 23/04* (2013.01); *G01L 17/00* (2013.01); *B60C 19/00* (2013.01)

(58) Field of Classification Search
CPC ..... B60C 23/0416; B60C 23/04; B60C 19/00; G01L 17/00
(Continued)

(56) References Cited

U.S. PATENT DOCUMENTS 6,018,993 A * 2/2000 Normann ............ B60C 23/0416
73/146.5
6,825,758 B1 * 11/2004 Laitsaari ............. B60C 23/0433
116/34 R
(Continued)

FOREIGN PATENT DOCUMENTS

JP 2010-221768 A 10/2010
JP 2010-266314 A 11/2010

OTHER PUBLICATIONS

International Search Report, Application No. PCT/JP2017/035791, dated Dec. 12, 2017. ISA/Japan Patent Office.

*Primary Examiner* — Nay Tun
(74) *Attorney, Agent, or Firm* — Honigman LLP (57) ABSTRACT

A tire air pressure detection system and a vehicle body side device to detect air pressure of a plurality of tires. The vehicle body side device causes a transmission unit to transmit to all tire side devices, a transmission stop signal instructing transition to a transmission stop state and then the transmission unit transmits a transmission standby signal at a transmission strength that enables the signal to reach the tire side devices; and then the transmission unit transmits to the one of the tire side devices, a transmission request signal requesting a transmission of a signal including a unique identifier stored in that tire side device; and when it is determined that a reception unit has received a response
(Continued)

signal in response to the transmission request signal, the transmission unit transmits a transmission standby signal and a transmission request signal to the tire side device corresponding to the next tire.

5 Claims, 6 Drawing Sheets

(58) Field of Classification Search
USPC .......................................................... 340/445
See application file for complete search history.

(56) References Cited

U.S. PATENT DOCUMENTS

| | | | | |
|---|---|---|---|---|
| 8,120,474 B2 * | 2/2012 | Fujioka | ................ | B60R 25/245 |
| | | | | 340/426.13 |
| 8,760,279 B2 * | 6/2014 | Andou | ................ | B60C 23/0408 |
| | | | | 340/444 |
| 9,527,351 B2 * | 12/2016 | Hsu | .................... | B60C 23/0447 |
| 2004/0230350 A1 | 11/2004 | Ogawa et al. | | |
| 2006/0214780 A1 | 9/2006 | Mathias et al. | | |

* cited by examiner

TIRE AIR PRESSURE DETECTION SYSTEM AND VEHICLE BODY SIDE DEVICE

CROSS-REFERENCE TO RELATED APPLICATIONS

This application is the U.S. national stage of PCT/JP2017/035791 filed Oct. 2, 2017, which claims priority of Japanese Patent Application No. JP 2016-197313 filed Oct. 5, 2016, the contents of which are incorporated herein.

TECHNICAL FIELD

The present disclosure relates to a tire air pressure detection system.

BACKGROUND

Tire pressure monitoring systems (TPMS) are used to detect the air pressures in each of a plurality of tires mounted on vehicle wheels and issue a warning or the like when an abnormal air pressure is detected. JP 2010-221768A discloses a tire air pressure alert system including: a sensor unit including air pressure sensors provided in each of the tires; a vehicle body-side controller that receives detection signals from the sensor unit; and an initiator (LF antenna), provided in the tire housing of each tire, that transmits a LF (low frequency) signal to the sensor unit. In a TPMS configured in this manner, the LF signals are transmitted sequentially from the tire initiators to the corresponding sensor units in response to instructions from the controller, the sensor units that have received the LF signals respond with RF (radio frequency) signals to the controller, and the controller associates the tires with the detection result. There is a problem in that the LF signals transmitted from the initiators at this time may be received not by the corresponding sensor unit, but by the sensor unit of another tire, resulting in crosstalk that makes it unclear which tire sensor unit the response signal is from. As a preventative measure against the occurrence of crosstalk, JP 2010-221768A proposes a particular configuration in which the initiators corresponding to the other sensor units, aside from the one sensor unit to be communicated with, emit interfering waves to prevent the LF signal that is to be received by the one sensor unit from being received by other sensor units.

In the system disclosed in JP 2010-221768A, it is necessary to transmit interference waves, which wastefully consumes power. A special circuit for emitting the interference waves is also necessary. Thus what is needed, in TPMS, is a way of more efficiently and accurately identifying the detection signals from tires, including preventing erroneous recognition after the mounted tires have been rotated or the like.

Having been achieved in light of the foregoing circumstances, an object of the present disclosure is to provide a tire air pressure detection system and a vehicle body side device which are capable of efficiently and accurately identifying tires and detecting the respective air pressures thereof.

SUMMARY

A tire air pressure detection system according to one aspect of the present disclosure is a tire air pressure detection system including: a tire side device, provided in each of a plurality of tires mounted on the vehicle, each tire side device including a sensor that detects the air pressure in the corresponding tire, a tire side reception unit that wirelessly receives a signal requesting the sensor to transmit a measurement result, and a tire side transmission unit that wirelessly transmits the measurement result in response to the request; and a vehicle body side device, provided in a body of the vehicle, the vehicle body side device including a vehicle body side transmission unit and a vehicle body side reception unit that wirelessly transmit and receive signals to and from the tire side devices, and the vehicle body side device acquiring the air pressure in each tire and detecting a decrease in the air pressure. Each tire side device includes: a storage unit that stores an identifier identifying that tire side device; and a control unit that stops the transmission by the tire side transmission unit in the case where a transmission stop signal instructing a transition to a transmission stop state has been received by the tire side reception unit, and that, after the tire side reception unit has received a transmission standby signal instructing a transition to a transmission standby state, causes a response signal including the identifier to be transmitted from the tire side transmission unit in response to the transmission request signal. The vehicle body side device includes: a transmission control unit that causes the transmission stop signal to be transmitted from the vehicle body side transmission unit to all of the tire side devices of the plurality of tires, then transmits the transmission standby signal from the vehicle body side transmission unit at a transmission strength that reaches the tire side device in one of the plurality of tires, and then causes the transmission request signal to be transmitted from the vehicle body side transmission unit; and a determination unit that determines whether or not the vehicle body side reception unit has received a response signal in response to the transmission request signal. In the case where the determination unit determines that the response signal has been received, the transmission control unit causes the vehicle body side transmission unit to transmit the transmission standby signal at a transmission strength that reaches the tire side device of the next tire, and then to transmit the transmission request signal, to the tire side device.

A vehicle body side device according to one aspect of the present disclosure is a vehicle body side device provided in a body of a vehicle, the vehicle body side device including a transmission unit and a reception unit that wirelessly transmit and receive signals to and from tire side devices provided in a corresponding plurality of tires mounted on the vehicle. The vehicle body side device further includes: a first transmission control unit that causes a transmission stop signal instructing a transition to a transmission stop state to be transmitted from the transmission unit to all of the tire side devices in the plurality of tires; a second transmission control unit that, after the transmission stop signal has been transmitted by the first transmission control unit, causes the transmission unit to transmit a transmission standby signal instructing a transition to a transmission standby state, at a transmission strength that will reach the tire side device in one of the plurality of tires; a third transmission control unit that, after the transmission standby signal has been transmitted by the second transmission control unit, causes the transmission unit to transmit a transmission request signal, indicating a request for the transmission of a signal including a unique identifier stored in the tire side device, to the one tire side device; and a determination unit that determines whether or not the reception unit has received a response signal in response to the transmission request signal. In the case where the determination unit determines that the response signal has been received, the second transmission control unit causes the transmission standby signal to be transmitted to the tire side device corresponding to the next one tire, and the third transmission control unit then causes the transmission request signal to be transmitted.

This application can be realized not only as a tire air pressure detection system including these characteristic constituent parts and a vehicle body side device constituting this system, but also as a tire air pressure detection method including such characteristic steps, a program for causing a computer to execute those steps, and the like. Additionally, the application can be realized as a semiconductor integrated circuit implementing some or all of the tire air pressure detection system and the vehicle body side device, as another system including the tire air pressure detection system or the vehicle body side device, and the like.

Advantageous Effects of Disclosure

According to the foregoing, a sensor can be accurately identified in each of tires, and the air pressures in the tires can be accurately identified and detected, without using hardware that outputs an interference wave.

DETAILED DESCRIPTION OF PREFERRED EMBODIMENTS

Description of Embodiments of the Present Disclosure

First, embodiments of the present disclosure will be listed and described. The embodiments described hereinafter may be at least partially combined as desired.

A tire air pressure detection system according to one aspect of the present disclosure is a tire air pressure detection system including: a tire side device, provided in each of a plurality of tires mounted on the vehicle, each tire side device including a sensor that detects the air pressure in the corresponding tire, a tire side reception unit that wirelessly receives a signal requesting the sensor to transmit a measurement result, and a tire side transmission unit that wirelessly transmits the measurement result in response to the request; and a vehicle body side device, provided in a body of the vehicle, the vehicle body side device including a vehicle body side transmission unit and a vehicle body side reception unit that wirelessly transmit and receive signals to and from the tire side devices, and the vehicle body side device acquiring the air pressure in each tire and detecting a decrease in the air pressure. Each tire side device includes: a storage unit that stores an identifier identifying that tire side device; and a control unit that stops the transmission by the tire side transmission unit in the case where a transmission stop signal instructing a transition to a transmission stop state has been received by the tire side reception unit, and that, after the tire side reception unit has received a transmission standby signal instructing a transition to a transmission standby state, causes a response signal including the identifier to be transmitted from the tire side transmission unit in response to the transmission request signal. The vehicle body side device includes: a transmission control unit that causes the transmission stop signal to be transmitted from the vehicle body side transmission unit to all of the tire side devices of the plurality of tires, then transmits the transmission standby signal from the vehicle body side transmission unit at a transmission strength that reaches the tire side device in one of the plurality of tires, and then causes the transmission request signal to be transmitted from the vehicle body side transmission unit; and a determination unit that determines whether or not the vehicle body side reception unit has received a response signal in response to the transmission request signal. In the case where the determination unit determines that the response signal has been received, the transmission control unit causes the vehicle body side transmission unit to transmit the transmission standby signal at a transmission strength that reaches the tire side device of the next tire, and then to transmit the transmission request signal, to the tire side device.

According to this aspect of the present disclosure, the tire side devices are controlled to transition to the transmission stop state once all together, and then transition to the transmission standby state one at a time, and only the tire side device that has transitioned to the transmission standby state transmits the response signal to the vehicle body side device. As a result, even if a request to transmit information including an identifier has been successfully received by the plurality of tire side devices, only the tire side device that has transitioned to the transmission standby state responds. Accordingly, the vehicle body side device can identify the transmission source from the identifier included in the response signals transmitted in sequence.

In a tire air pressure detection system according to one aspect of the present disclosure, in the case where the determination unit determines that the response signal has not been received, the transmission control unit causes the vehicle body side transmission unit to transmit the transmission standby signal and the transmission request signal to the one tire side device again at a higher transmission strength than the stated transmission strength.

According to this aspect of the present disclosure, if the response signal cannot be received despite the transmission standby signal and the transmission request signal having been transmitted, the transmission strength is increased. The transmission standby signal and the transmission request signal can be transmitted at a transmission strength at which only the one intended tire side device can receive the signals.

In a tire air pressure detection system according to one aspect of the present disclosure, the vehicle body side device transmits the transmission stop signal, the transmission standby signal, and the transmission request signal from antennas provided in corresponding tire housings of the plurality of tires; the transmission control unit includes a selection unit that selects transmission strengths for the antennas from a plurality of levels in a range that reaches the interior of wheels from the tire housings; and the transmission strength of the transmission standby signal and the transmission request signal is selected by the selection unit in order from the lowest strength among the plurality of levels.

According to this aspect of the present disclosure, the transmission strengths of the transmission standby signal and the transmission request signal are gradually increased from a plurality of levels in a range that reaches the interior of wheels from the tire housings. The transmission standby signal and the transmission request signal can be transmitted at an appropriate transmission strength at which only the one intended tire side device can receive the signals.

A vehicle body side device according to one aspect of the present disclosure is a vehicle body side device, provided in a body of a vehicle, the vehicle body side device including a transmission unit and a reception unit that wirelessly transmit and receive signals to and from tire side devices provided in a corresponding plurality of tires mounted on the vehicle. The vehicle body side device further includes: a first transmission control unit that causes a transmission stop signal instructing a transition to a transmission stop state to be transmitted from the transmission unit to all of the tire side devices in the plurality of tires; a second transmission control unit that, after the transmission stop signal has been transmitted by the first transmission control unit, causes the transmission unit to transmit a transmission standby signal instructing a transition to a transmission standby state, at a transmission strength that will reach the tire side device in one of the plurality of tires; a third transmission control unit that, after the transmission standby signal has been transmitted by the second transmission control unit, causes the transmission unit to transmit a transmission request signal, indicating a request for the transmission of a signal including a unique identifier stored in the tire side device, to the one tire side device; and a determination unit that determines whether or not the reception unit has received a response signal in response to the transmission request signal. In the case where the determination unit determines that the response signal has been received, the second transmission control unit causes the transmission standby signal to be transmitted to the tire side device corresponding to the next one tire, and the third transmission control unit then causes the transmission request signal to be transmitted.

According to this aspect of the present disclosure, even if a request to transmit information including the identifier has been received by the plurality of tire side devices, the information response signal is transmitted only from the tire side device that has transitioned to the transmission standby state, as in the above-described (1). Thus the vehicle body side device can identify the transmission source from the identifier included in the response signals transmitted in sequence.

Details of Embodiment of Present Disclosure

A specific example of the tire air pressure detection system according to an embodiment of the present disclosure will be described hereinafter will reference to the drawings. Note that the present disclosure is not intended to be limited to these examples, and is defined instead by the scope of the appended claims. All changes that fall within the same essential spirit and scope as the scope of the claims are intended to be included therein as well.

Figure 1:
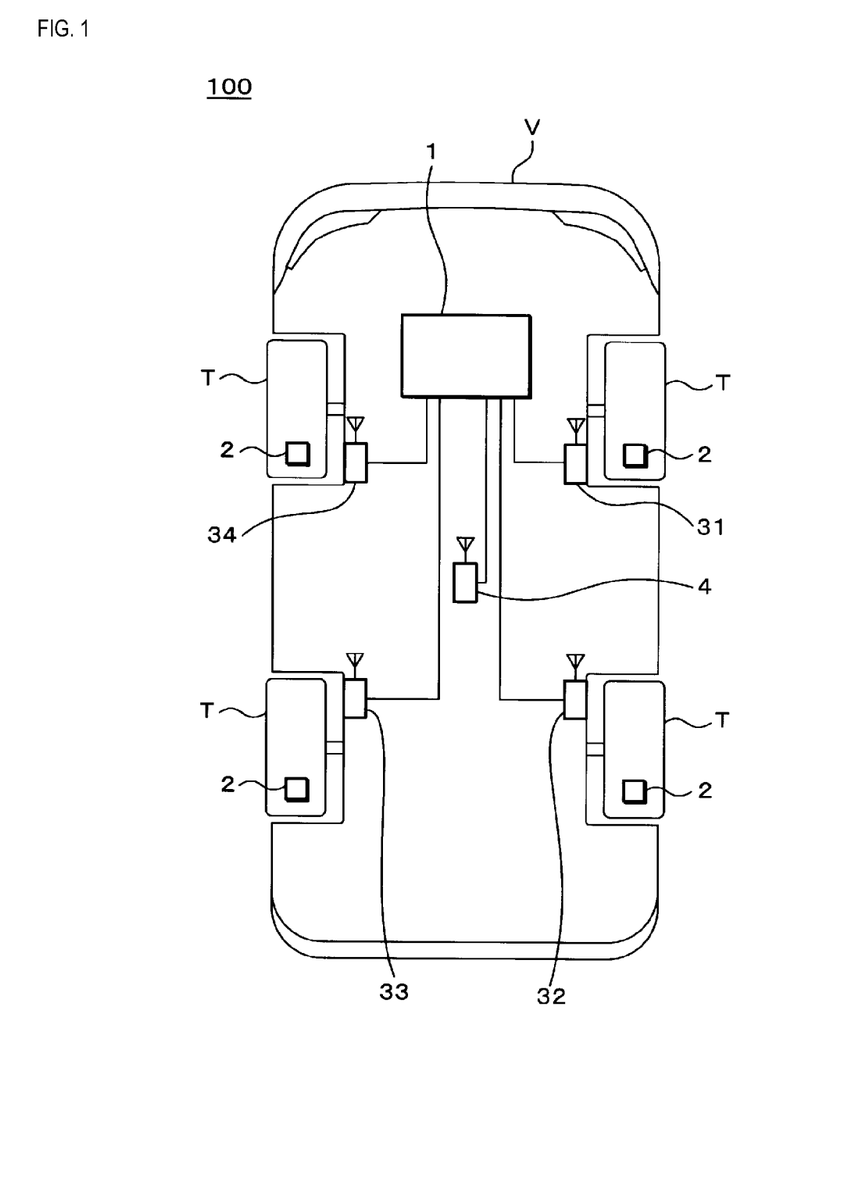
FIG. 1 is a schematic diagram illustrating the arrangement of constituent parts of a tire air pressure detection system according to an embodiment.

FIG. 1 is a schematic diagram illustrating the arrangement of constituent parts of a tire air pressure detection system 100 according to the present embodiment. The tire air pressure detection system 100 according to the present embodiment includes a vehicle body side device 1, and the same number of tire side devices 2 as there are mounted tires T.

The vehicle body side device 1 is disposed within or below an instrument panel. The vehicle body side device 1 is connected to transmission antennas 31 to 34, provided in the tire housings of corresponding ones of the tires T, by signal lines.

The transmission antenna 31 is provided in a position corresponding to the front-right tire T, the transmission antenna 32 is provided in a position corresponding to the rear-right tire T, the transmission antenna 33 is provided in a position corresponding to the rear-left tire T, and the transmission antenna 34 is provided in a position corresponding to the front-left tire T. The transmission antennas 31 to 34 are antennas that transmit wireless signals to the tire side devices 2. The frequency band of the carrier wave of the signals transmitted from the transmission antennas 31 to 34 uses a LF (low frequency) band, for example (e.g., 125 kHz). Although the frequency band is not limited thereto, preferably, a frequency band that is different from that of a reception antenna 4, described later, and that experiences marked attenuation with increased distance, is used.

The vehicle body side device 1 is connected to the reception antenna 4, which is provided on the roof of a vehicle V, by a signal line. The reception antenna 4 is provided within the lining of the roof of the vehicle V for example. The reception antenna 4 receives the signals transmitted from the tire side devices 2. The frequency band of the received carrier wave is a RF (radio frequency) band (e.g., 300 MHz, UHF). The frequency band is not limited thereto.

The tire side devices 2 are provided within the wheels of the tires, and correspond to sensor units that measure the air pressures in the tires using pressure sensors such as diaphragms or the like and wirelessly transmit air pressure signals resulting from the measurement.

Figure 2:
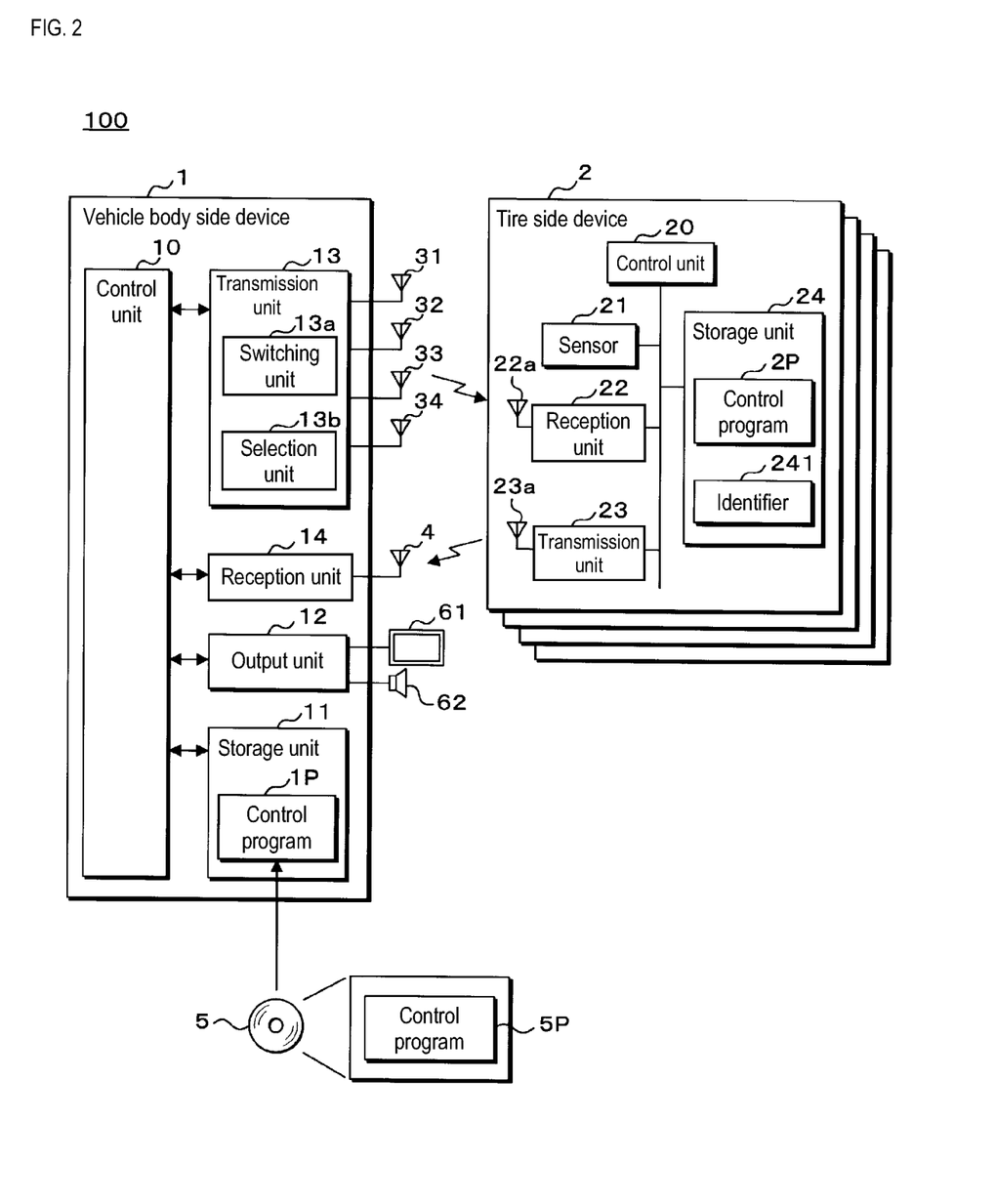
FIG. 2 is a block diagram illustrating the configuration of the tire air pressure detection system according to the embodiment.

FIG. 2 is a block diagram illustrating the configuration of the tire air pressure detection system 100 according to the present embodiment. The vehicle body side device 1 is what is known as a BCM (Body Control Module) unit, which carries out comprehensive control of body system actuators, such as controlling the locking/unlocking of door locks in the vehicle V controlling the vehicle interior/exterior lights, and so on. The vehicle body side device 1 includes a control unit 10, a storage unit 11, an output unit 12, a transmission unit 13, and a reception unit 14, and operates under power supplied from a battery.

The control unit 10 is, for example, a microcontroller that uses one or more CPUs (Central Processing Units) or a multi-core CPU, and includes ROM (Read Only Memory), RAM (Random Access Memory), an input/output interface, a timer, and the like. The control unit 10 controls the various constituent parts on the basis of a control program 1P stored in the storage unit 11. Note that the control program 1P may be stored in ROM built into the control unit 10.

The storage unit 11 uses non-volatile memory such as flash memory. The storage unit 11 stores the above-described control program 1P in addition to various types of information referred to by the control unit 10. Note that the storage unit 11 also stores associations between identification numbers transmitted from the tire side devices 2 and identification information of the respective tires T (front-right, front-left, rear-right, rear-left, spare, and the like), as will be described later. The control program 1P stored in the storage unit 11 may instead be recorded in a computer-readable recording medium 5.

The storage unit 11 stores a control program 5P read out from the recording medium 5 by a readout device, which is not illustrated. The recording medium 5 is an optical disk such as a CD (Compact Disc)-ROM, a DVD (Digital Versatile Disc)-ROM, a BD (Blu-ray) (registered trademark) Disc, a magnetic disk such as a flexible disk or a hard disk, a magneto-optical disk, semiconductor memory, or the like. Alternatively, the control program 5P according to the first embodiment may be downloaded from an external computer (not shown) connected to a communication network (not shown), and stored in the storage unit 11.

The output unit 12 is connected to a display 61 and a speaker 62.

It is also possible to use only one of the display 61 and the speaker 62. The output unit 12 outputs control signals to the display 61 and audio signals to the speaker 62 under the control of the control unit 10.

The display 61 is a display light provided within a panel for instruments, including a speedometer, on the instrument panel. An LED (Light Emitting Diode) may be used. Alternatively, a heads-up display may be used. The display 61 may be a type with a built-in touch panel used in a navigation system or the like, using a display panel such as an LCD (Liquid Crystal Display) or organic EL (Electro Luminescence). The display 61 displays images or text on the basis of signals output from the output unit 12.

The speaker 62 emits audio or sound effects on the basis of signals output from the output unit 12.

The transmission unit 13 uses a transmission module, connected to the transmission antennas 31 to 34, and including a modulator that modulates the signals transmitted from the transmission antennas 31 to 34.

The transmission unit 13 contains a switching unit 13a, and can select and use some or all of the plurality of transmission antennas 31 to 34 using the switching unit 13a. Additionally, the transmission unit 13 includes a selection unit 13b capable of selecting a signal output, and can cause the selection unit 13b to select a transmission strength, from the transmission antennas 31 to 34, from among a plurality of output levels (strengths).

The reception unit 14 is connected to the reception antenna 4, and uses a reception circuit including an amplifier, a filter circuit, and a demodulator for radio waves received by the reception antenna 4.

The tire side device 2 includes a control unit 20, a sensor 21, a reception unit 22, a transmission unit 23, and a storage unit 24. The tire side device 2 operates under power supplied from the battery or a built-in battery.

The control unit 20 is, for example, a microcontroller that uses one or more CPUs or a multi-core CPU, and includes ROM, RAM, an input/output interface, a timer, and the like. The CPU of the control unit 20 is connected to the sensor 21, the reception unit 22, the transmission unit 23, and the storage unit 24 via the input/output interface.

The sensor 21 uses a diaphragm, for example, and measures the air pressure in the tire T on the basis of an amount of deformation in the diaphragm which changes in accordance with the magnitude of the pressure. The sensor 21 outputs the measurement result as a signal (having a voltage level based on the air pressure) to the control unit 20. Note that the sensor 21 may be further configuration to use a temperature sensor to output a signal indicating a temperature to the control unit 20.

The reception unit 22 extracts a reception signal by removing carrier wave components from a plurality of wireless signals received through an antenna 22a, and outputs the extracted reception signal to the control unit 20. In the present embodiment, an LF band is used as the frequency band of the carrier wave of the wireless signals received by the antenna 22a. As long as the frequency band of the carrier wave received by the antenna 22a corresponds to the vehicle-side transmission antennas 31 to 34, the frequency band is not limited thereto.

The transmission unit 23 is a circuit that uses a carrier wave to modulate a signal input by the control unit 20 and transmits a wireless signal through a transmission antenna 23a. In the present embodiment, an RF band (UHF band) is used as the frequency band of the carrier wave of the signal transmitted from the transmission antenna 23a. However, as long as the frequency band used by the transmission antenna 23a corresponds to the vehicle-side reception antenna 4, the frequency band is not limited thereto.

The storage unit 24 is non-volatile memory such as flash memory. The storage unit 24 stores a control program 2P for causing the control unit 20 to control the operations of the constituent parts of the tire side device 2, i.e., to execute a process of transmitting and receiving tire air pressure measurement results, which will be described later. The storage unit 24 also stores, in advance, a unique identifier 241 that enables the plurality of tire side devices 2 to be distinguished from one another. Although FIG. 2 illustrates the control unit 20 and the storage unit 24 as separate constituent parts, the configuration may be such that the storage unit 24 is provided within the control unit 20, or that the control program 2P and the identifier 241 are stored in a storage unit built into the control unit 20.

In the tire air pressure detection system 100 configured in this manner, the control unit 10 of the vehicle body side device 1 periodically acquires the air pressure of each tire T. For example, the control unit 10 of the vehicle body side device 1 transmits measurement result transmission requests as LF signals from the transmission antennas 31 to 34, in sequence to the tire side device 2 of each tire T. When a tire side device 2 receives a transmission request addressed to itself, the tire side device 2 transmits a measurement result obtained from a measurement taken by the sensor 21, along with the identifier 241 stored in the storage unit 24, from the antenna 23a of the transmission unit 23 as an RF signal. The control unit 10 of the vehicle body side device 1 receives the response as an RF signal in the reception unit 14, using the reception antenna 4, and identifies which tire T the measurement result is from on the basis of the information of the identifier 241.

Once the air pressures of the tires T have been acquired, the control unit 10 compares those pressures with an air pressure decrease threshold, and if the pressure is determined to be below the threshold, causes the output unit 12 to output a warning that the air pressure of that tire T is low, through the display 61 or the speaker 62. The warning includes information specifying the tire position of the tire T in which the air pressure decrease has occurred. The display 61 lights a warning light indicating one of the four wheels, displays text information reading "front-right tire pressure low", or the like, for example. The speaker 62 outputs a sound effect as the warning light is lit, outputs audio saying "front-right tire pressure low", or the like, for example. The threshold referred to during the comparison may be a threshold based on the type of the vehicle V and the tire T. In this manner, the user can be made aware of the need for maintenance on the tire T in which the air pressure decrease has occurred. Note that appropriate driving control can also be carried out by notifying a drive control system of the vehicle V of the air pressure decrease.

At this time, in the tire air pressure detection system 100, it is necessary to store (register) the identifiers 241 received along with the measurement result signals from the tire side devices 2 in the storage unit 11 in association with the front-right, rear-right, rear-left, and front-left (and furthermore, the spare, if included) tire positions. This is because the tire T can be changed along with the entire wheel, and thus the relationship between the tire side device 2 and the tire position is not fixed. Although the relationship between the identifier 241 and the tire position is registered initially (at the time of shipping), aside from that, the registration is carried out in the vehicle body side device 1 when the occurrence of crosstalk between tire side devices 2 has been detected. The occurrence of crosstalk is detected when, for example, the control unit 10 of the vehicle body side device 1 has caused a measurement value transmission request signal to be transmitted from the transmission antenna 31 to the tire side device 2 corresponding to the front-right tire T, but measurement results have been transmitted as response signals from a plurality of tire side devices 2. Note that the registration may be carried out when, with power being supplied from the battery (when the ignition switch is on or accessories are turned on), the control unit 10 detects that a reset button provided in the vehicle body side device 1 has been pressed. Alternatively, the control unit 10 may detect the tire T being replaced, and the registration may be carried out automatically.

Figure 3:
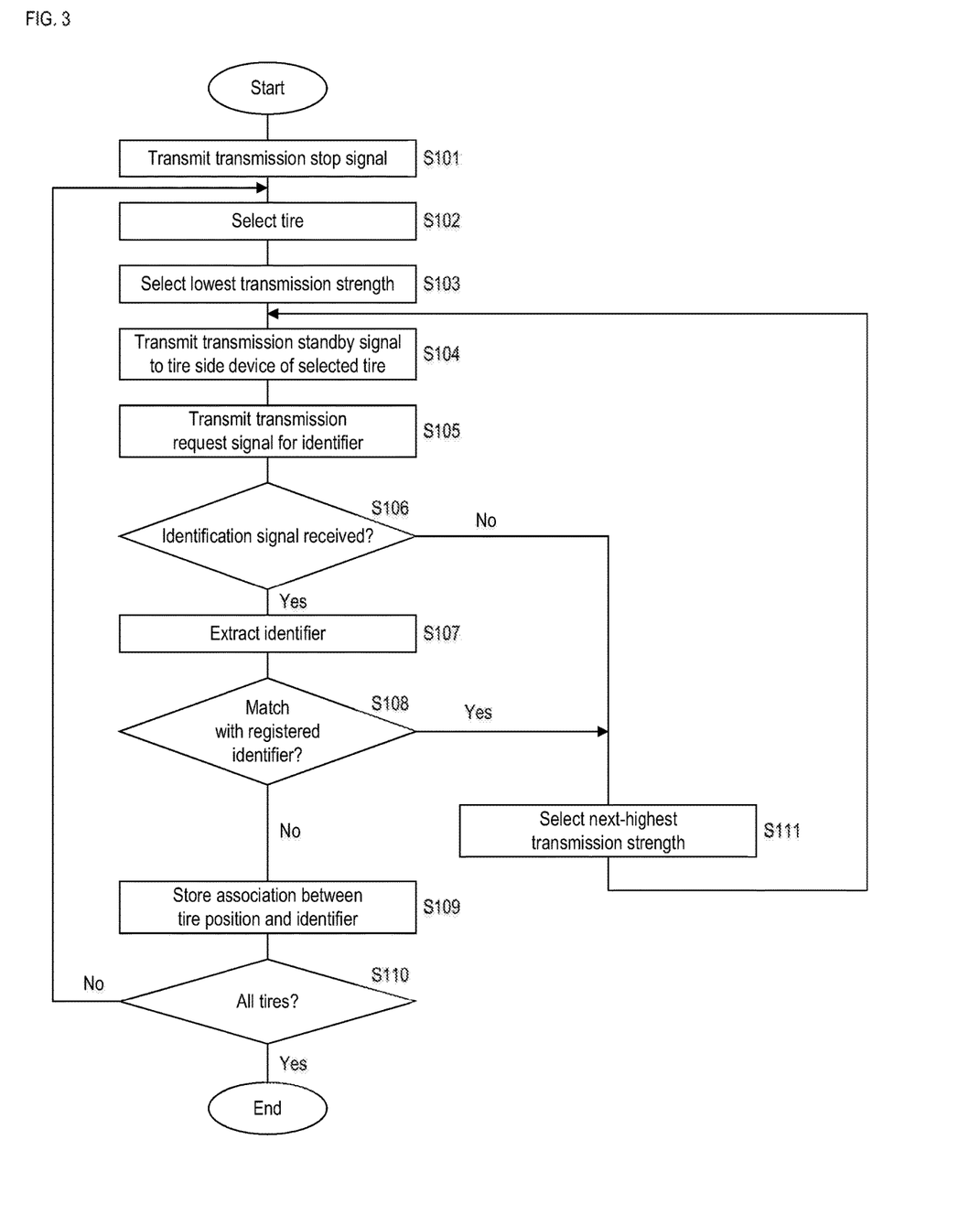
FIG. 3 is a flowchart illustrating an example of a process of registering identifiers and tire positions carried out in the tire air pressure detection system.
Figure 4:
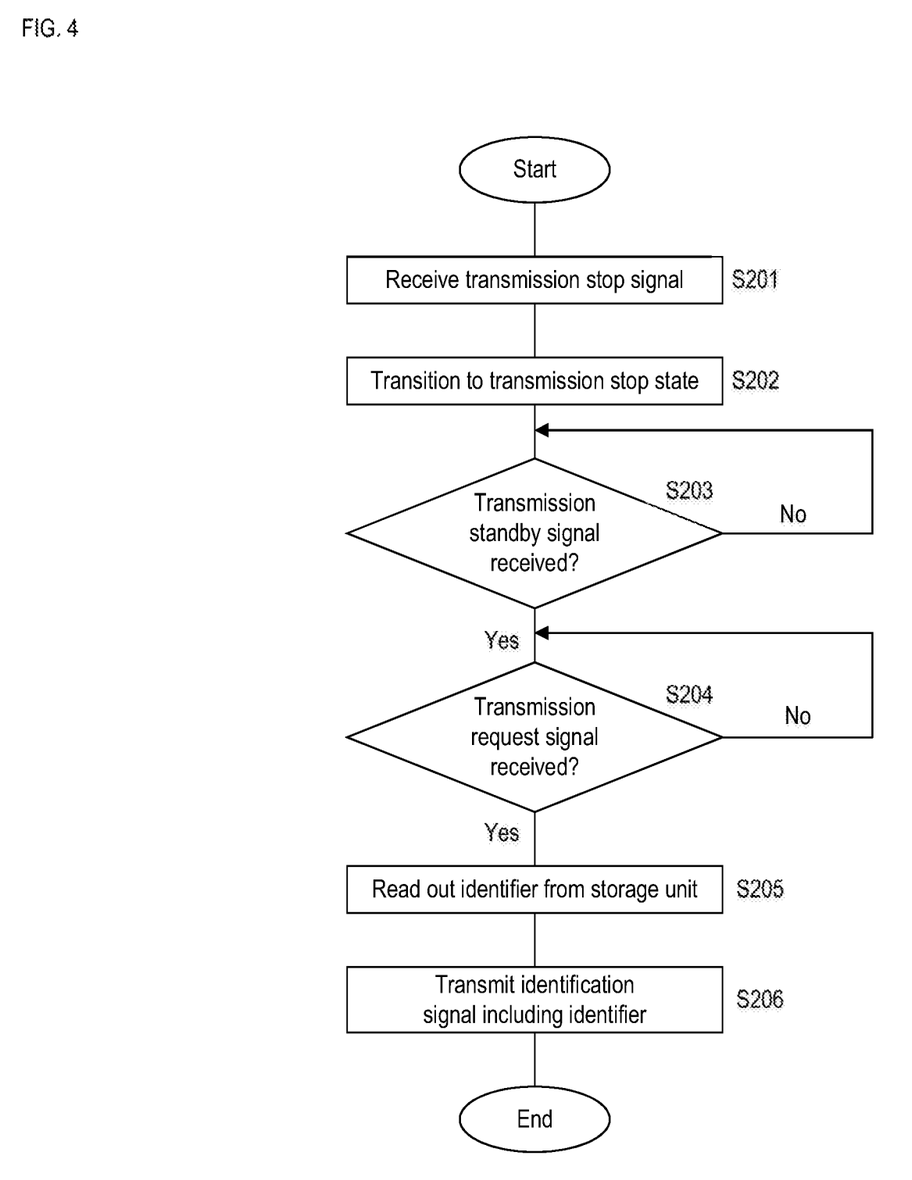
FIG. 4 is a flowchart illustrating an example of a process of registering identifiers and tire positions carried out in the tire air pressure detection system.

FIGS. 3 and 4 are flowcharts illustrating an example of a process of registering the identifiers 241 and tire positions carried out in the tire air pressure detection system 100. The flowchart in FIG. 3 indicates a processing sequence carried out in the vehicle body side device 1. First, the control unit 10 of the vehicle body side device 1 causes the transmission unit 13 to transmit transmission stop signals to all of the tire side devices 2 from all of the transmission antennas 31 to 34 (step S101). The transmission stop signal is a signal for permitting the tire side device 2 to receive signals through the reception unit 22 but prohibiting signal transmission from the transmission unit 23.

Next, the control unit 10 selects a tire T to which a transmission request for an identification signal, including the identifier 241, is to be made, according to a predetermined order (e.g., front-right, rear-right, rear-left, and front-left) (step S102).

Next, using the selection unit 13b of the transmission unit 13, the control unit 10 selects the one of the transmission antennas 31 to 34 having the lowest transmission strength with respect to the tire T selected in step S102 (step S103). The control unit 10 causes a transmission standby signal to be transmitted from the one of the transmission antennas 31 to 34 corresponding to the tire T selected by the switching unit 13a (step S104). The transmission standby signal is a signal for causing the tire side device 2 to permit signal transmission from the transmission unit 23, and after receiving the transmission standby signal, the tire side device 2 can transmit a signal in response to receiving a transmission request signal.

The control unit 10 causes the one of the transmission antennas 31 to 34 corresponding to the selected tire T to transmit a transmission request signal for a signal including the identifier 241 (step S105). Prior to step S105, the control unit 10 may use the selection unit 13b to select a strength higher than the lowest strength. The transmission request signal transmitted by the transmission antennas 31 to 34 is received by the reception unit 22 of the tire side device 2 corresponding to the selected tire T, and that tire side device 2 transmits an identification signal, including the identifier 241 stored in the storage unit 24, from the transmission unit 23 as a response signal. At this time, it is possible that the tire side devices 2 corresponding to tires T that are not the selected tire T receive the transmission request signal not intended for those tire side devices 2. However, these tire side devices 2 are prohibited from transmitting signals, and thus remain in a transmission stop state without making a response.

After step S105, the control unit 10 determines whether or not the identification signal has been received from the tire side device 2 in the selected tire T through the reception antenna 4 (step S106).

If it is determined in step S106 that the identification signal has been received (S106: YES), the control unit 10 extracts the identifier 241 from the identification signal received by the reception unit 14 (step S107). The control unit 10 determines whether or not the extracted identifier 241 matches the one already stored in association in the storage unit 11 (step S108). If it is determined in step S108 that the identifier does not match (S108: NO), the control unit 10 stores the identifier in the storage unit 11 in association with the tire position of the selected tire T (step S109), and then determines whether or not the association and registration of tire positions and identifiers are complete for all of the tires T (step S110).

If it is determined in step S109 that the association and registration are complete (S110: YES), the control unit 10 ends the registration process.

If it is determined in step S110 that the association and registration are not complete (S110: NO), the control unit 10 returns the process to step S102, selects the next tire T, and executes the process.

If, in step S106, it is determined that the identification signal is not received (S106: NO), after standing by for a predetermined period, the selection unit 13b of the transmission unit 13 selects the one of the transmission antennas 31 to 34 corresponding to the selected tire T that has the transmission strength that is next-highest from the lowest transmission strength (step S111). The control unit 10 then returns the process to step S104, and causes a transmission standby signal to be transmitted at a higher transmission strength. Note that the process of step S111 is not necessary, and in this case, the control unit 10 may carry out a process of making multiple attempts or the like.

Furthermore, if it is determined in step S108 that the identifiers match (S108: YES), the control unit 10 moves the process to step S111.

The flowchart in FIG. 4 indicates an example of a processing sequence carried out in the tire side device 2. The control unit 20 on the tire side device 2 side receives the transmission stop signal through the reception unit 22 (step S201), and transitions to a transmission stop state (step S202). Thereafter, the control unit 20 permits the reception of signals by the reception unit 22, but prohibits the transmission of signals from the transmission unit 23.

The control unit 20 then determines whether or not the transmission standby signal has been received (step S203). If it is determined in step S203 that the signal has not been received (S203: NO), the control unit 20 returns the process to step S203 and stands by until it is determined that the transmission standby signal has been received.

If in step S203 it is determined that the signal has been received (S203: YES), the control unit 20 determines whether or not the transmission request signal has been received (step S204). If it is determined that the transmission request signal has not been received (S204: NO), the control unit 20 returns the process to step S204 and stands by until it is determined that the transmission request signal has been received.

If it is determined in step S204 the signal has been received (S204: YES), the control unit 20 reads out the identifier 241 from the storage unit 24 (step S205). The control unit 20 generates the identification signal, including the read-out identifier 241, and supplies the signal to the transmission unit 23, causes that signal to be transmitted to the vehicle body side device 1 (step S206), and then ends the process. Thereafter, it is preferable that the control unit 20 transitions to a measurement standby state of standing by for the reception of the measurement result transmission request signal. In the measurement standby state, if a measurement request signal has been received from the vehicle body side device 1, the control unit 20 takes a measurement and transmits the measurement result along with the identifier 241 from the transmission unit 23. Even if the control unit 20, which has transitioned to the measurement standby state, has received a transmission request signal for an identification signal, transmitted from the one of the transmission antennas 31 to 34 selected as having a high transmission strength, it is preferable that the control unit 20 discard that signal and not transmit a response signal.

Through this processing, it is possible to prevent the mixing of wireless signals between the tire side devices 2 of the tires T and the vehicle body side device 1, and accurately update and register the identifiers identifying the tires, without using hardware for transmitting interference waves. Because the identifiers can be updated and registered accurately, it is possible to determine which tire T the transmission origin of the measurement result corresponds to by having the tire side devices 2 transmit the measurement results along with the identifiers 241 when subsequently detecting the tire air pressures. Accordingly, the tire air pressure detection system 100 can accurately identify the tires and detect the air pressures.

Figure 5:
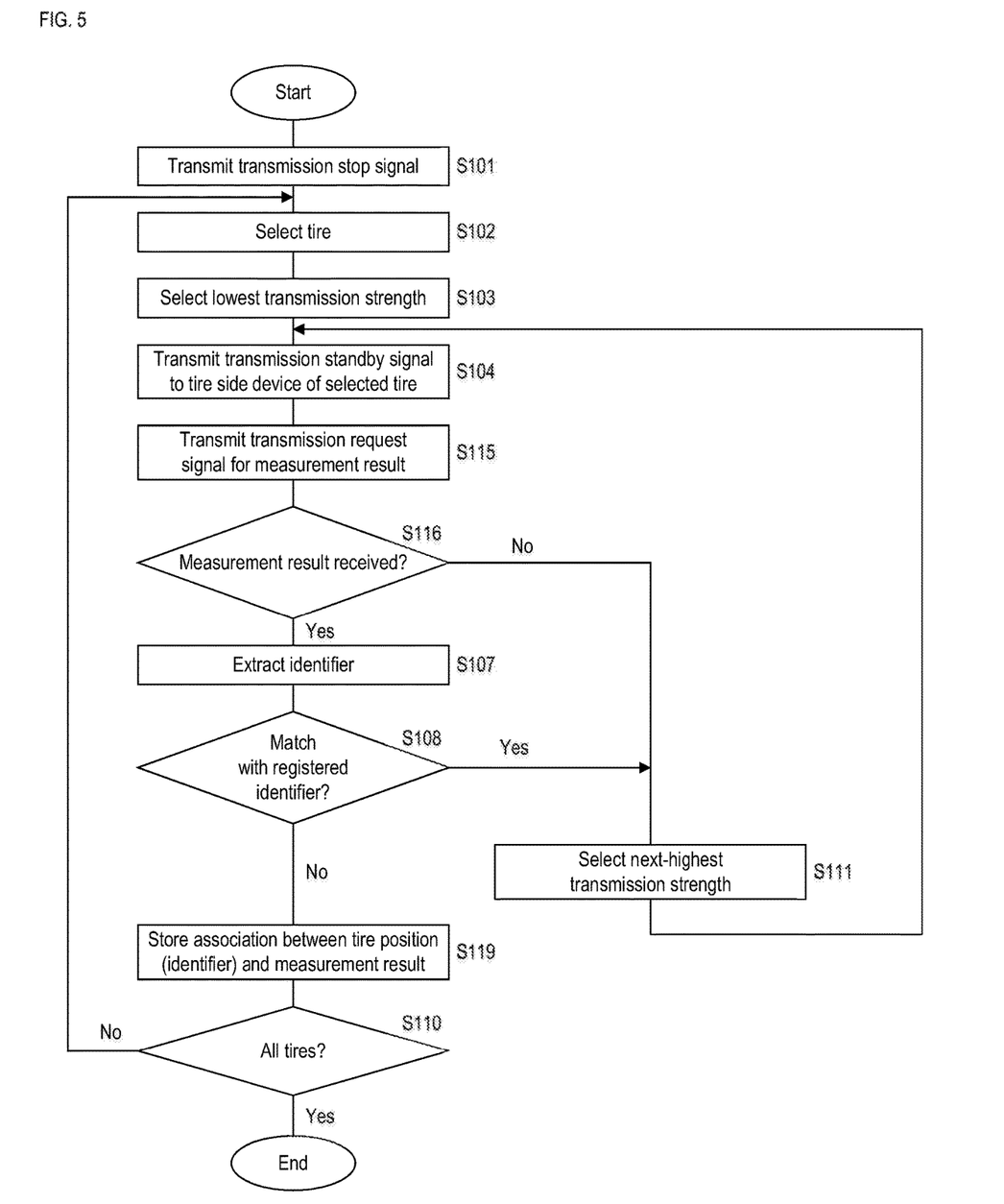
FIG. 5 is a flowchart illustrating an example of a processing sequence when detecting tire air pressures.
Figure 6:
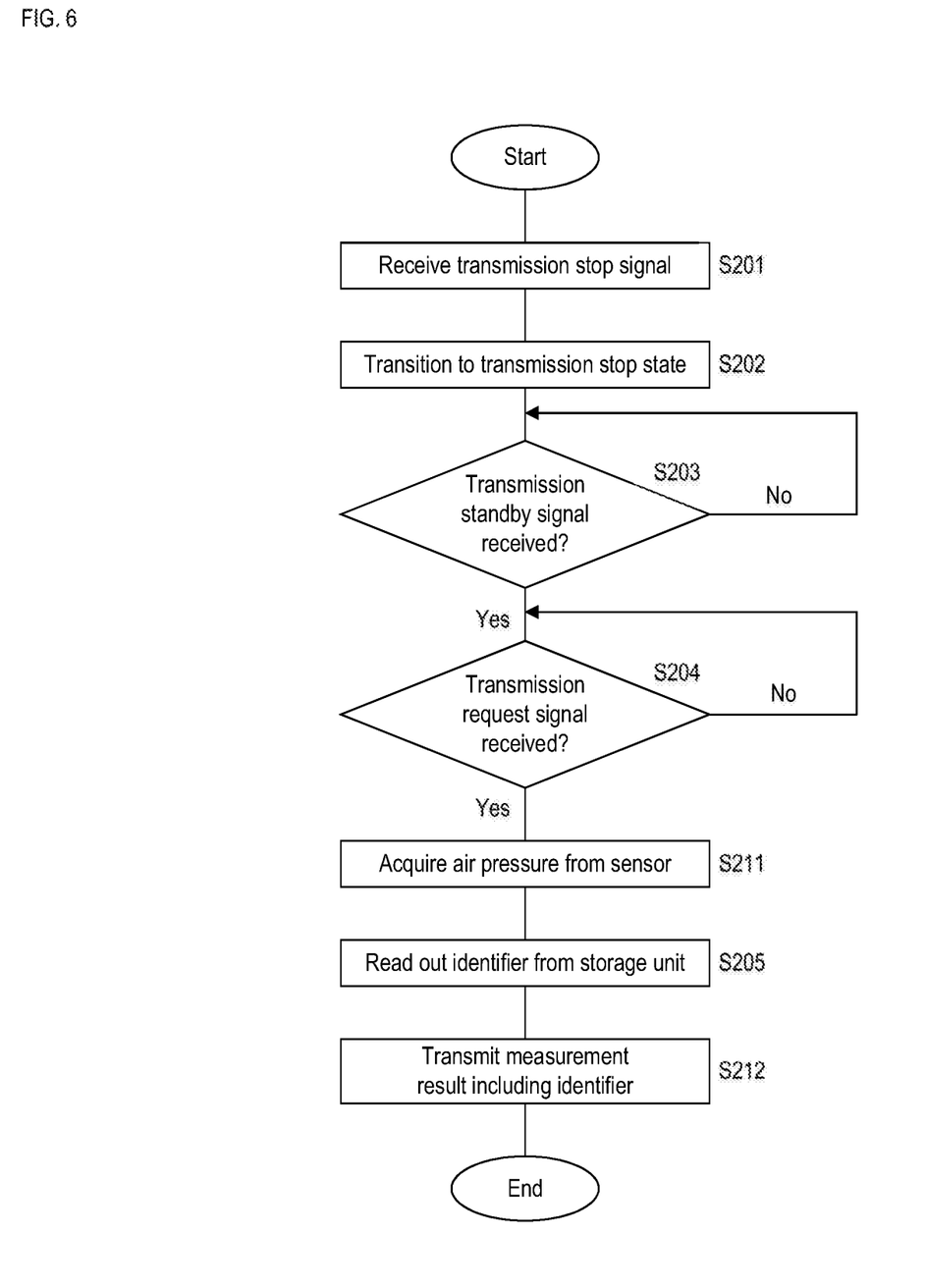
FIG. 6 is a flowchart illustrating an example of a processing sequence when detecting tire air pressures.

Note that when the control unit 10 sequentially transmits the measurement result transmission request signals from the transmission antennas 31 to 34, and the measurement results are transmitted from the tire side devices 2 as responses, the control unit 10 may identify which of the tire positions the measurement results correspond to. FIGS. 5 and 6 are flowcharts illustrating an example of a processing sequence when detecting tire air pressures. The flowchart in FIG. 5 indicates a processing sequence carried out in the vehicle body side device 1. Note that processes in the processing sequence indicated in the flowchart of FIG. 5 that are the same as those in the processing sequence indicated in the flowchart of FIG. 3 are given the same step numbers, and detailed descriptions thereof will be skipped.

After the transmission standby signal has been transmitted in step S104, the control unit 10 transmits the measurement result transmission request signal from the one of the transmission antennas 31 to 34 corresponding to the selected tire T (step S115). A higher strength than the lowest strength may be selected by the selection unit 13*b* as the transmission strength used in the transmission of step S115.

Then, the control unit 10 determines whether or not the measurement result has been received from the tire side device 2 in the selected tire T through the reception antenna 4 (step S116). If in step S116 it is determined that the measurement result has been received (S116: YES), the control unit 10 extracts the identifier 241 included in the measurement result received by the reception unit 14 (S107). Then, if in step S108 it is determined that the extracted identifier 241 does not match the identifier already stored in association with the storage unit 11 (S108: NO), the control unit 10 stores the received measurement result in the storage unit 11 association with the tire position of the selected tire T (step S119). The control unit 10 then determines whether or not measurement results have been stored for all of the tires T (S110). Note that in step S119, the control unit 10 may store the correspondence between the tire position of the tire T and information of the identifier 241 included in the measurement result in the storage unit 11.

The flowchart in FIG. 6 indicates a processing sequence carried out in the tire side device 2. Note that processes in the processing sequence indicated in the flowchart of FIG. 6 that are the same as those in the processing sequence indicated in the flowchart of FIG. 4 are given the same step numbers, and detailed descriptions thereof will be skipped.

If it is determined in step S204 that the signal has been received (S204: YES), the control unit 20 of the tire side device 2 acquires the information of the air pressure from the sensor 21 (step S211), and causes a measurement result including the identifier 241 read out from the storage unit 24 in step S205 to be transmitted from the transmission unit 23 (step S212). As a result, the vehicle body side device 1 accurately identifies and stores the air pressure measurement result for each of the tires T, as described above.

In this manner, when transmitting a measurement result from the tire side devices 2 as a response to a measurement result transmission request, the tire side devices 2 transition to the transmission stop state each time a measurement is carried out, and then sequentially transition to the transmission standby state and transmit the measurement result. As a result, the vehicle body side device 1 can accurately identify the tires T and acquires the air pressure measurement results.

Although the present embodiment describes a tire air pressure detection system, the vehicle body side device 1 is a BCM unit as described above, and thus the transmission antennas 31 to 34 and the reception antenna 4 may be shared with another communication system. The communication system is a passive entry system, for example. The passive entry system is constituted by the vehicle body side device 1 and a mobile unit belonging to the passive entry system. The vehicle body side device 1 uses the transmission antennas 31 to 34 and the reception antenna 4, or some of those antennas, to communicate wirelessly with a mobile unit in a user's possession, and authenticates the mobile unit and detects the position of the mobile unit. A touch sensor, which is not illustrated, is provided in a door handle of the vehicle V, and when the touch sensor detects that the user's hand has made contact with the door handle, a door switch has been pressed, or the like, the vehicle body side device 1 executes a process for locking and unlocking the door of the vehicle V or the like when an authentic mobile unit is present outside the vehicle. Preferably, the vehicle body side device 1 selects a stronger level for the signal output of the transmission antennas 31 to 34 when communicating wirelessly with the mobile unit, and selects as weak a level as possible for the signal output of the transmission antennas 31 to 34 when transmitting signals to the tire side devices 2. A passive entry system is one example, and the present disclosure can be applied in any system where control is carried out by communicating wirelessly between the vehicle body side device 1 and another wireless communication device. For example, a vehicle communication system may, along with the T PMS, constitute a keyless entry system, a SmartStart (registered trademark) system that makes it possible to start the motor, air conditioner, or the like provided in the vehicle V without using a mechanical key, or the like.

The embodiments disclosed here are intended to be in all ways exemplary and in no ways limiting. The scope of the present disclosure is defined not by the foregoing descriptions but by the scope of the claims, and is intended to include all changes equivalent in meaning and scope of the claims.

The invention claimed is:

1. A tire air pressure detection system comprising:
   a tire side device, provided in each of a plurality of tires mounted on a vehicle, each tire side device including a sensor that detects the air pressure in the corresponding tire, a tire side reception unit that wirelessly receives a signal requesting the sensor to transmit a measurement result, and a tire side transmission unit that wirelessly transmits the measurement result in response to the request; and
   a vehicle body side device, provided in a body of the vehicle, the vehicle body side device including a vehicle body side transmission unit and a vehicle body side reception unit that wirelessly transmit and receive signals to and from the tire side devices, and
   the vehicle body side device acquiring the air pressure in each tire and detecting a decrease in the air pressure,
   wherein each tire side device includes:
   a storage unit that stores an identifier identifying that tire side device; and
   a control unit that stops the transmission by the tire side transmission unit in the case where a transmission stop signal instructing a transition to a transmission stop state has been received by the tire side reception unit, and that, after the tire side reception unit has received a transmission standby signal instructing a transition to a transmission standby state, causes a response signal including the identifier to be transmitted from the tire side transmission unit in response to the transmission request signal,
   the vehicle body side device includes:
   a transmission control unit that causes the transmission stop signal to be transmitted from the vehicle body side transmission unit to all of the tire side devices of the plurality of tires, then transmits the transmission standby signal from the vehicle body side transmission unit at a transmission strength that reaches the tire side device in one of the plurality of tires, and then causes the transmission request signal to be transmitted from the vehicle body side transmission unit; and
   a determination unit that determines whether or not the vehicle body side reception unit has received a response signal in response to the transmission request signal, and
   in the case where the determination unit determines that the response signal has been received, the transmission control unit causes the vehicle body side transmission unit to transmit the transmission standby signal at a transmission strength that reaches the tire side device of the next tire, and then to transmit the transmission request signal, to the tire side device.

2. The tire air pressure detection system according to claim 1,
   wherein in the case where the determination unit determines that the response signal has not been received, the transmission control unit causes the vehicle body side transmission unit to transmit the transmission standby signal and the transmission request signal to the one tire side device again at a higher transmission strength then the stated transmission strength.

3. The tire air pressure detection system according to claim 1,
   wherein the vehicle body side device transmits the transmission stop signal, the transmission standby signal, and the transmission request signal from antennas provided in corresponding tire housings of the plurality of tires;
   the transmission control unit includes a selection unit that selects transmission strengths for the antennas from a plurality of levels in a range that reaches the interior of wheels from the tire housings; and
   the transmission strength of the transmission standby signal and the transmission request signal is selected by the selection unit in order from the lowest strength among the plurality of levels.

4. A vehicle body side device, provided in a body of a vehicle, the vehicle body side device comprising a transmission unit and a reception unit that wirelessly transmit and receive signals to and from tire side devices provided in a corresponding plurality of tires mounted on the vehicle, the vehicle body side device further comprising:
   a first transmission control unit that causes a transmission stop signal instructing a transition to a transmission stop state to be transmitted from the transmission unit to all of the tire side devices in the plurality of tires;
   a second transmission control unit that, after the transmission stop signal has been transmitted by the first transmission control unit, causes the transmission unit to transmit a transmission standby signal instructing a transition to a transmission standby state, at a transmission strength that will reach the tire side device in one of the plurality of tires;
   a third transmission control unit that, after the transmission standby signal has been transmitted by the second transmission control unit, causes the transmission unit to transmit a transmission request signal, indicating a request for the transmission of a signal including a unique identifier stored in the tire side device, to the one tire side device; and
   a determination unit that determines whether or not the reception unit has received a response signal in response to the transmission request signal,
   wherein in the case where the determination unit determines that the response signal has been received, the second transmission control unit causes the transmission standby signal to be transmitted to the tire side device corresponding to the next one tire, and the third transmission control unit then causes the transmission request signal to be transmitted.

5. The tire air pressure detection system according to claim 2,
   wherein the vehicle body side device transmits the transmission stop signal, the transmission standby signal, and the transmission request signal from antennas provided in corresponding tire housings of the plurality of tires;
   the transmission control unit includes a selection unit that selects transmission strengths for the antennas from a plurality of levels in a range that reaches the interior of wheels from the tire housings; and
   the transmission strength of the transmission standby signal and the transmission request signal is selected by the selection unit in order from the lowest strength among the plurality of levels.

* * * * *